(12) United States Patent
Chandhoke

(10) Patent No.: US 6,865,441 B2
(45) Date of Patent: Mar. 8, 2005

(54) PARALLEL TRAJECTORY GENERATION, INTERPOLATION, AND CONTROL IN A MOTION CONTROL APPLICATION

(75) Inventor: Sundeep Chandhoke, Austin, TX (US)

(73) Assignee: National Instruments Corporation, Austin, TX (US)

( * ) Notice: Subject to any disclaimer, the term of this patent is extended or adjusted under 35 U.S.C. 154(b) by 130 days.

(21) Appl. No.: 10/434,414

(22) Filed: May 8, 2003

(65) Prior Publication Data

US 2004/0122557 A1 Jun. 24, 2004

Related U.S. Application Data

(63) Continuation-in-part of application No. 10/326,434, filed on Dec. 19, 2002, now abandoned.

(51) Int. Cl.$^7$ .............................................. G05B 13/02
(52) U.S. Cl. ........................... 700/189; 700/44; 700/45; 700/60; 700/61; 700/186; 700/188; 318/560; 318/561; 318/671; 708/290
(58) Field of Search .............................. 700/44, 60, 61, 700/63, 69, 45, 28, 189, 186, 188; 708/290; 318/560, 561, 671

(56) References Cited

U.S. PATENT DOCUMENTS

| | | | | |
|---|---|---|---|---|
| 3,970,830 A | * | 7/1976 | White et al. | 700/187 |
| 5,726,896 A | * | 3/1998 | Jia et al. | 700/187 |
| 6,782,306 B2 | * | 8/2004 | Yutkowitz | 700/189 |

OTHER PUBLICATIONS

Jerk–bounded manipulator trajectory planning: design for real–time applications Macfarlane, S.; Croft, E.A.; Robotics and Automation, IEEE Transactions on, vol.: 19, Issue: 1, Feb. 2003 ☐☐ pp.:42–52.☐☐.*
Toward an integrated curriculum of systems, controls, and machinery Chandhoke, S.; Qu, Z.; Kaloust, J.H.; Cai, H.; Southcon/95. Conference Record, Mar. 7–9, 1995 pp.:236–239.☐☐.*
Rocket trajectory correction using strap–on GPS guided thrusters Drescher, T.; Kreuzer, W.; Nielson, J.; Position Location and Navigation Symposium, IEEE 1998 , Apr. 20–23, 1998 pp.:387–394.*
National Instruments The Measurement and Automation Catalog 2002, pp. 580–599.

* cited by examiner

*Primary Examiner*—Ramesh Patel
(74) *Attorney, Agent, or Firm*—Meyerstons Hood Kivlin Kowert & Goetzel, P.C.; Jeffrey C. Hood; Jason L. Burgess

(57) ABSTRACT

A system and method for performing trajectory generation, interpolation, and control for a motion control application, where the trajectory generation, interpolation, and control are performed in parallel with each other. In one embodiment, an FPGA in a motion control device may be configured to perform the trajectory generation, interpolation, and control in parallel. Performing trajectory generation, interpolation, and control in parallel on an FPGA may increase the efficiency of the motion control application.

45 Claims, 15 Drawing Sheets

PARALLEL TRAJECTORY GENERATION, INTERPOLATION, AND CONTROL IN A MOTION CONTROL APPLICATION

CONTINUATION DATA

This application is a continuation-in-part of U.S. utility application Ser. No. 10/326,434 titled "Parallel Trajectory Generation, Interpolation, and Control in a Motion Control Application" filed Dec. 19, 2002 now abandoned, whose inventor was Sundeep Chandhoke.

FIELD OF THE INVENTION

The present invention relates to the field of automated motion control. In particular, the invention relates to a system and method for improving motion control applications by performing trajectory generation, interpolation, and control in parallel.

DESCRIPTION OF THE RELATED ART

Automated motion control involves precisely controlling the movement of a device or system. Automated motion control is widely used in many different types of applications, including applications in the fields of industrial automation, process control, test and measurement, robotics, and integrated machine vision, among others.

One aspect of motion control involves trajectory generation. A motion control move may entail movement along one or more spatial axes and may have any of various paths, such as a straight line move, arc move, contoured move, etc. Trajectory generation involves calculating points along the path of movement. The calculated points may then be used to generate appropriate control signals to control a motor to move along the path.

Some systems also perform interpolation of the generated trajectory data. Interpolation involves performing a spline algorithm or other algorithm that interpolates between points generated by the trajectory generation algorithm to maintain smooth motion.

FIG. 1 illustrates an exemplary motion control system. Supervisory control functionality 14 handles user requests (e.g., from user program 12), monitors I/O 26, and does command sequencing for making moves. Trajectory generator 16 generates the set point for control loop 18 to move actuator 22 in the desired profile at the desired velocity. The user may set the properties for the move. Control loop 18 maintains the closed loop control on the actuator 22.

These components interact with the real world components of the drive 20, actuator 22, and feedback system 24. The user typically defines the desired move profile or geometry for moving the actuator 22. Move constraints such as velocity, acceleration, deceleration, and jerk are provided to the trajectory generator 16 along with this geometry. Trajectory generator 16 breaks the entire profile into points based on the move constraints and provides these points to control loop 18 every "dt" or time period. Control loop 18 uses these points as the set points for the closed loop control. The output of control loop 18 is usually to a digital to analog converter (DAC). The DAC value is amplified by the drive 20 (usually a current amplifier) and converted into current, which is applied to the actuator 22. The feedback device 24 (usually an encoder) provides position feedback that is used by control loop 18 to close the loop. Additional digital I/O 26 in the form of limit switches and home switches are used by supervisory control 14 to stop motion in case physical end of travel is reached or during an initialization move sequence (e.g., finding the home switch or encoder index).

Of the components discussed above, trajectory generator 16 and control loop 18 typically need the most determinism and have the most effect on the performance of the motion control system. In different systems, trajectory generator 16 and control loop 18 can be implemented in different hardware components. For example, FIG. 2 illustrates a system in which trajectory generator 16 and control loop 18 are implemented in standalone controller 40. As shown, communication with standalone controller 40 may occur through PCI, a serial interface (e.g., RS 232, USB, FireWire, etc.), Ethernet, etc.

FIG. 3 illustrates a system utilizing a smart motor or smart drive. In this case, trajectory generator 16 and control loop 18 are implemented in the drive-motor combination or the drive respectively. As shown, communication with standalone controller 40 may occur through a serial interface (e.g., RS 232, USB, FireWire, etc.), Ethernet, etc.

Another architecture that is becoming very popular is called Soft Motion, illustrated in FIG. 4. In this case control loop 18 is implemented in the drive, and supervisory control 14 and trajectory generator 16 are implemented on a PC running a real time operating system or real time extension.

Irrespective of the distribution of the components, broadly speaking there are two approaches for implementing the trajectory generator and the control loop. One approach is illustrated in FIG. 5. The trajectory generation and control are calculated at each occurrence of a timer interrupt, e.g., using a DSP or microcontroller. Trajectory generator 16 calculates the set points for all the actuators supported (e.g., one actuator for each axis) and provides them to control loop 18. Control loop 18 reads the feedback from the feedback device connected to each actuator, calculates the error, and drives the actuators using a control algorithm. This is done one actuator at a time. The FIG. 5 approach is typical for a standalone controller.

The second approach is illustrated in FIG. 6. Two processors are used, e.g., a DSP and micro-controller. The trajectory generation is performed in a loop running on one of the processors, and the control loop is implemented on the other processor. Control loop 18 is updated with new set points slower than the speed at which the control loop runs. As shown, an interpolation algorithm that interpolates between set points generated by trajectory generator 16 is performed at each interrupt for the control loop to maintain smooth motion.

The second approach allows the control loop to execute much faster than the first approach, giving better response time and tighter control. The control loop does not have the overhead of the trajectory generator and executes in parallel to the trajectory generator. In addition it makes it easier to distribute the trajectory generator and control loop onto different hardware. However the second approach is more complicated to implement, requiring two processors (two hardware systems) to interface. Also, in the second approach, the speed of the control loop is limited by the interpolation algorithm. Both approaches suffer from the problem that for multiple-input, multiple-output systems, each actuator is updated serially (sequentially).

SUMMARY OF THE INVENTION

One embodiment of the invention comprises a method for performing trajectory generation, interpolation, and control for a motion control application, where the trajectory generation, interpolation, and control are performed in parallel with each other. In one embodiment, a motion control device may be configured to perform the trajectory generation, interpolation, and control in parallel. In one embodiment, the motion control device includes a Field Programmable Gate Array (FPGA), and configuring the motion control device comprises configuring the FPGA.

According to one embodiment of the method, the FPGA may be configured to execute a trajectory generation algorithm. The trajectory generation algorithm may be operable to generate trajectory data. Generating the trajectory data may include calculating points along a path of movement. The calculated points may then be used in controlling motion along the path, e.g., to perform a straight line move, arc move, contoured move, or other type of move. In various embodiments, the trajectory generation algorithm may be performed in any of various ways. In one embodiment the trajectory generation algorithm may be implemented as a loop.

The FPGA may also be configured to execute an interpolation algorithm. The interpolation algorithm may be operable to interpolate the trajectory data generated by the trajectory generation algorithm. For example, interpolating the trajectory data may comprise performing a spline algorithm or other algorithm that interpolates between points generated by the trajectory generation algorithm to maintain smooth motion. Thus, the interpolated trajectory data may be used in controlling the motion rather than the raw trajectory data. In another embodiment, it may not be necessary to interpolate the trajectory data. For example, the application may not require smooth motion, or the points generated by the trajectory generation algorithm may be spaced so as to cause sufficiently smooth motion. Also, in one embodiment the trajectory generation and interpolation may be combined in a single algorithm. In various embodiments, the interpolation algorithm may be performed in any of various ways. In one embodiment the interpolation algorithm may be implemented as a loop.

The FPGA may also be configured to execute one or more control algorithms. The number of control algorithms may depend on the number of axes of motion for the particular application. Each control algorithm may be operable to control motion along one of the axes according to the interpolated trajectory data. For example, for motion in two dimensions, there may be two control algorithms. In various embodiments, the control algorithm(s) may be performed in any of various ways. In one embodiment each control algorithm may be implemented as a loop.

In the preferred embodiment, configuring the FPGA as described above includes configuring the FPGA to execute the trajectory generation algorithm, the interpolation algorithm, and the one or more control algorithms in parallel with each other. Thus, after being configured, the FPGA may execute the trajectory generation algorithm, the interpolation algorithm, and the control algorithms, where the algorithms execute in parallel.

Performing trajectory generation, interpolation, and control in parallel may increase the efficiency of the motion control application. For example, in one embodiment the motion may be performed incrementally at fixed time-step intervals. For example, a timer may cause periodic timer interrupts at the fixed time-step intervals. At each timer interrupt, the control algorithms may execute to control motion along the axes. In one embodiment the execution of the trajectory generation and interpolation algorithms may be coordinated with the execution of the control algorithms so that the interpolated trajectory data needed by the control algorithms for the current motion increment is immediately available when each timer interrupt occurs. Thus, the speed at which the control algorithms can perform the motion for each increment may be dependent only on the operations performed by the control algorithms themselves, since the trajectory generation and interpolation do not have to be performed in serial with the control. In a motion control application involving multiple axes, separate control algorithms may be responsible for controlling motion along each of the axes. The control algorithms may be executed in parallel with each other to allow the movement along the different axes to be performed in parallel. This may also increase the efficiency of the motion control application.

Also, the FPGA may be well-suited for performing the calculations involved in the trajectory generation and interpolation, which may also increase the efficiency of the motion control application.

Although the method is described above in terms of configuring an FPGA on the motion control device to execute the trajectory generation, interpolation, and control algorithms, various alternative embodiments are contemplated. For example, in another embodiment, the motion control device may include another type of functional unit instead of or in addition to an FPGA. For example, the motion control device may include another type of programmable or configurable device which may be configured to execute the trajectory generation, interpolation, and control algorithms in parallel.

Also, in one embodiment the trajectory generation, interpolation, and control algorithms may not all be executed by a single device. For example, the motion control device may include a plurality of FPGAs, where each FPGA executes one or more of the algorithms. In another embodiment, the motion control device may include a plurality of processors and one or more memories. Program instructions implementing the trajectory generation, interpolation, and control algorithms may be stored in the one or more memories such that the plurality of processors can execute the algorithms in parallel. In another embodiment, the motion control device may include one or more FPGAs as well as one or more processors and one or more memories. Thus, the algorithms may be executed in parallel by a combination of FPGAs and processors.

BRIEF DESCRIPTION OF THE DRAWINGS

A better understanding of the present invention can be obtained when the following detailed description of the preferred embodiment is considered in conjunction with the following drawings, in which.

Figure 1:
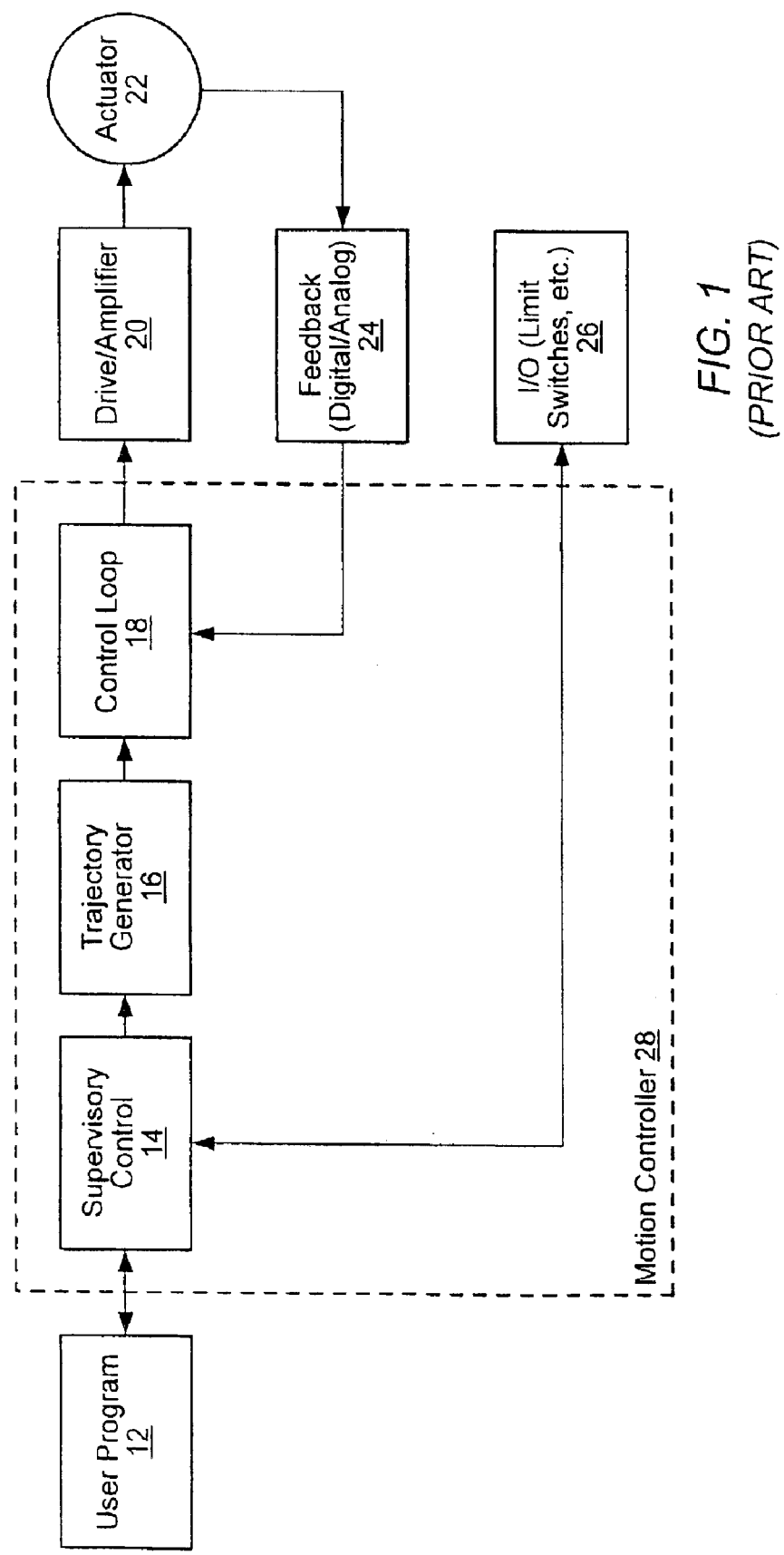
FIGS. 1–6 illustrate typical motion control systems as known in the prior art.
Figure 2:
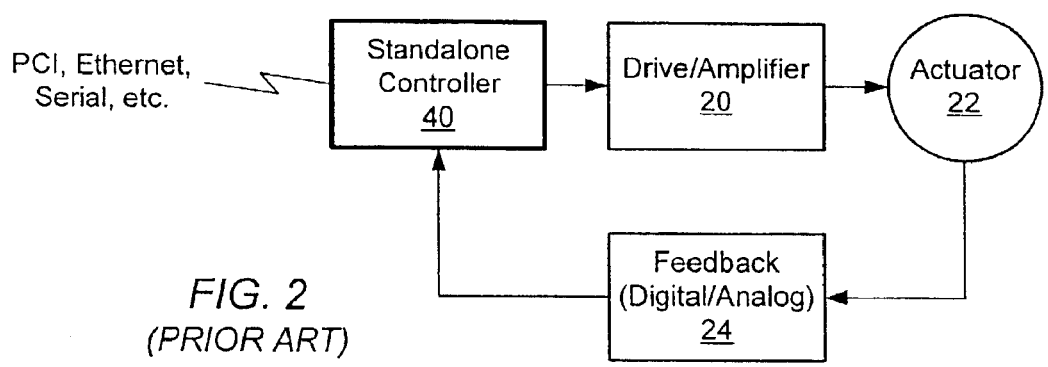
Figure 3:
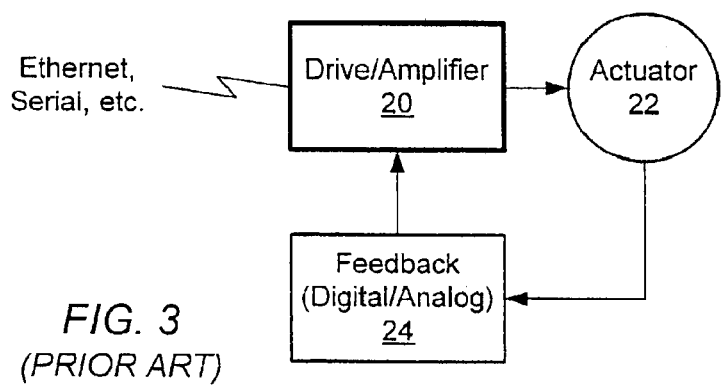
Figure 4:
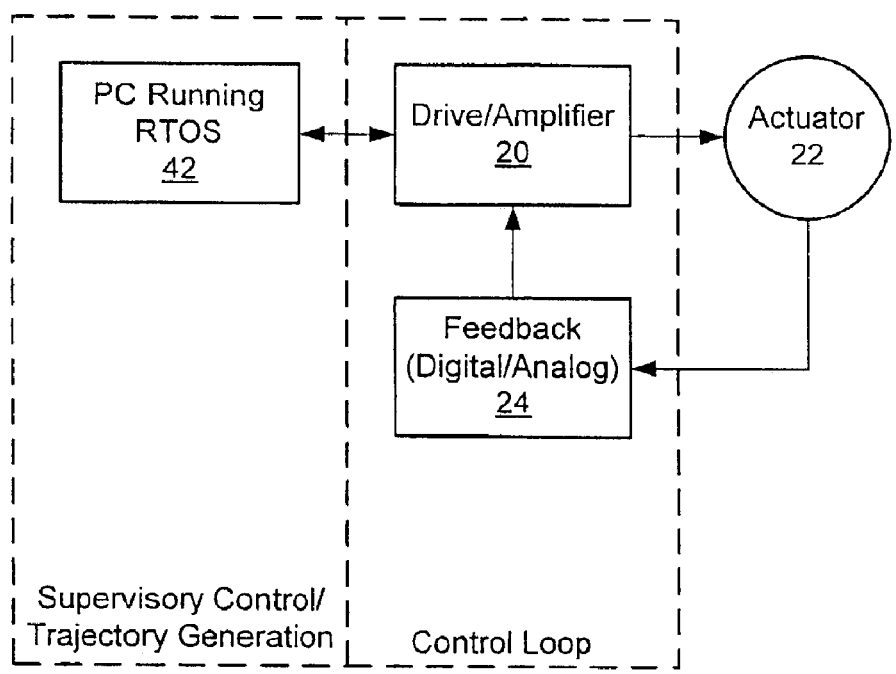
Figure 5:
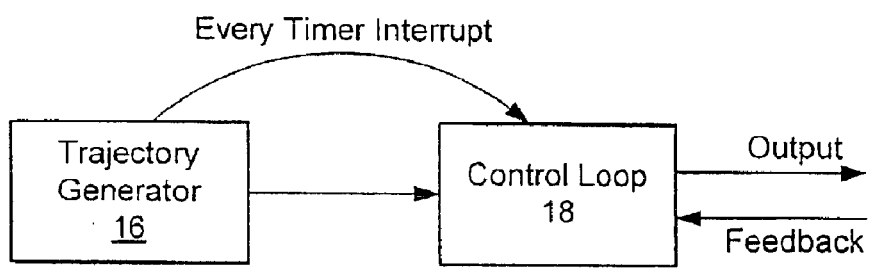
Figure 6:
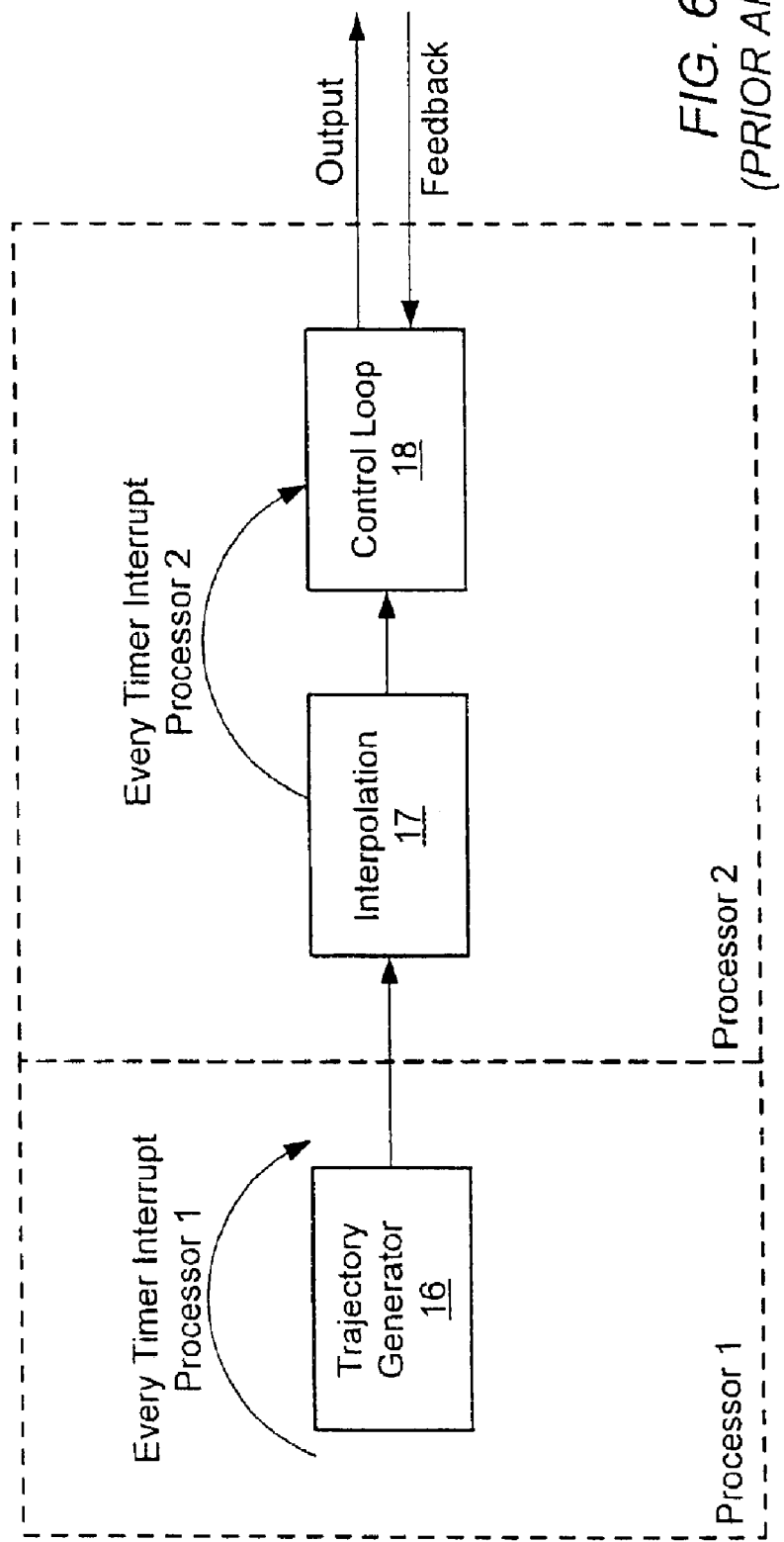

While the invention is susceptible to various modifications and alternative forms specific embodiments are shown by way of example in the drawings and are herein described in detail. It should be understood however, that drawings and detailed description thereto are not intended to limit the invention to the particular form disclosed, but on the contrary the invention is to cover all modifications, equivalents and alternative following within the spirit and scope of the present invention as defined by the appended claims.

DETAILED DESCRIPTION OF THE PREFERRED EMBODIMENTS

Incorporation by Reference

The following references are hereby incorporated by reference in their entirety as though fully and completely set forth herein.

U.S. Pat. No. 6,064,812 titled "System and Method for Developing Automation Clients Using a Graphical Data Flow Program," issued on May 16, 2000.

U.S. Pat. No. 6,102,965 titled "System and Method for Providing Client/Server Access to Graphical Programs," issued on Aug. 15, 2000.

U.S. Pat. No. 6,173,438 titled "Embedded Graphical Programming System" filed Aug. 18, 1997.

U.S. Pat. No. 6,219,628 titled "System and Method for Configuring an Instrument to Perform Measurement Functions Utilizing Conversion of Graphical Programs into Hardware Implementations," filed Aug. 18, 1997.

U.S. patent application Ser. No. 09/499,503 titled "System and Method for Configuring a Programmable Hardware Instrument to Perform Measurement Functions Utilizing Estimation of the Hardware Implementation and Management of Hardware Resources" filed Feb. 7, 2000.

U.S. patent application Ser. No. 09/617,600 titled "Graphical Programming System with Distributed Block Diagram Execution and Front Panel Display," filed Jun. 13, 2000.

U.S. patent application Ser. No. 09/518,492 titled "System and Method for Programmatically Creating a Graphical Program," filed Mar. 3, 2000.

U.S. patent application Ser. No. 09/587,682 titled "System and Method for Automatically Generating a Graphical Program to Perform an Image Processing Algorithm," filed Jun. 6, 2000.

U.S. patent application Ser. No. 09/595,003 titled "System and Method for Automatically Generating a Graphical Program to Implement a Prototype," filed Jun. 13, 2000.

U.S. patent application Ser. No. 09/745,023 titled "System and Method for Programmatically Generating a Graphical Program in Response to Program Information," filed Dec. 20, 2000.

U.S. patent application Ser. No. 10/051,268 titled "System and Method for Programmatically Generating a Graphical Program Based on a Sequence of Motion Control, Machine Vision, and Data Acquisition (DAQ) Operations," filed Jan. 18, 2002.

U.S. patent application Ser. No. 10/200,091 titled "System and Method for Configuring a Hardware Device to Execute a Prototype," filed Jul. 19, 2002.

Figure 7:
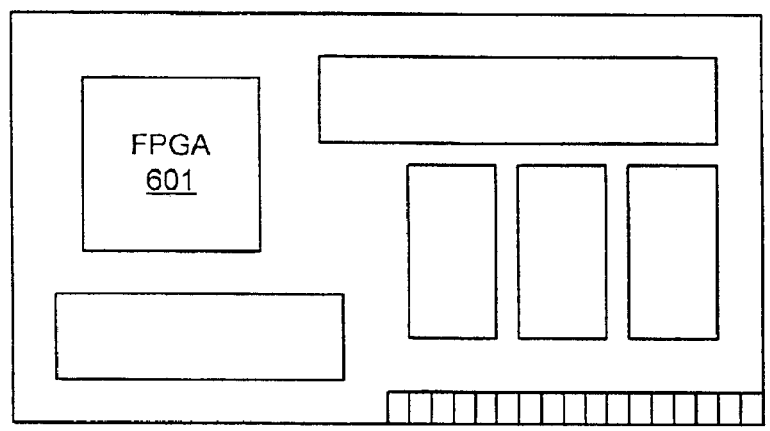
FIG. 7 illustrates a motion control device including an FPGA.

FIG. 7—Exemplary Motion Control Device

One embodiment of the invention comprises a method for performing trajectory generation, interpolation, and control for a motion control application, where the trajectory generation, interpolation, and control are performed in parallel with each other. In one embodiment, the parallel trajectory generation, interpolation, and control may be performed by a motion control device 600 such as shown in FIG. 7. In other embodiments, the parallel trajectory generation, interpolation, and control may be performed by a device other than a motion control device or may be performed by a motion control device in combination with one or more other devices.

As used herein, the term motion control device may refer to a device operable to control motion, e.g., by communicating with one or more motors or actuators to control motion along one or more axes of motion. The motion control device 600 illustrated in FIG. 7 has a form factor of a board which may be plugged into an I/O slot of a computer system or hardware chassis. In various other embodiments, the motion control device 600 may take on any of various other form factors.

As illustrated in FIG. 7, in one embodiment the motion control device may include a Field Programmable Gate Array (FPGA) 601. As described below, one embodiment of the invention comprises configuring the FPGA 601 to execute trajectory generation, interpolation, and control algorithms in parallel with each other. In another embodiment, the motion control device may include another type of functional unit instead of or in addition to an FPGA. For example, the motion control device may include another type of programmable or configurable device which may be configured to execute the trajectory generation, interpolation, and control algorithms in parallel.

Also, in one embodiment the trajectory generation, interpolation, and control algorithms may not all be executed by the same device. For example, the motion control device may include a plurality of FPGAs, where each FPGA executes one or more of the algorithms. In another embodiment, the motion control device may include a plurality of processors and one or more memories. Program instructions implementing the trajectory generation, interpolation, and control algorithms may be stored in the one or more memories such that the plurality of processors can execute the algorithms in parallel. In another embodiment, the motion control device may include one or more FPGAs as well as one or more processors and one or more memories. Thus, the algorithms may be executed in parallel by a combination of FPGAs and processors.

Figure 8A:
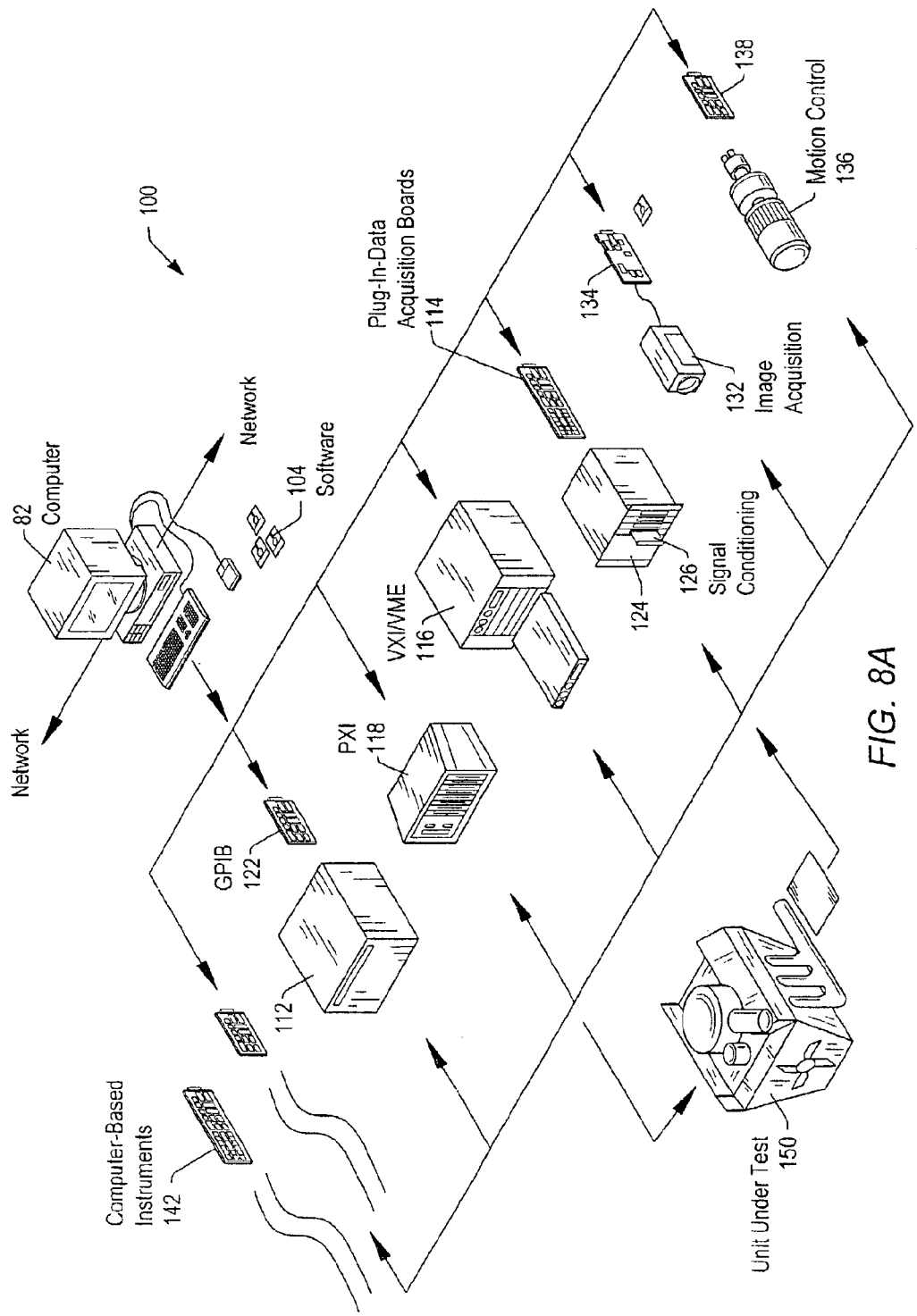
FIGS. 8A and 8B illustrate representative instrumentation and process control systems including various I/O interface options.
Figure 8B:
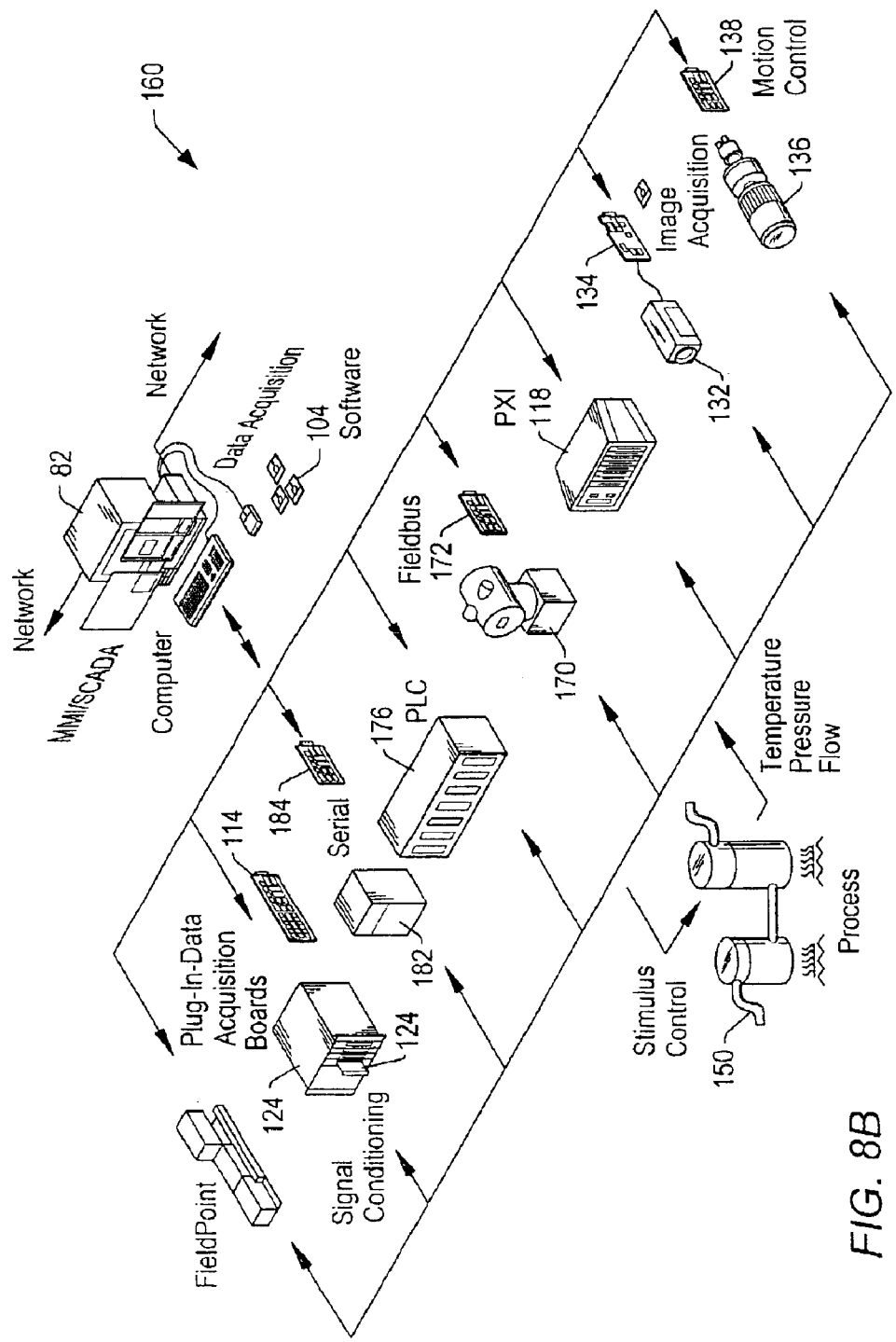

FIGS. 8A and 8B—Instrumentation and Industrial Automation Systems

The following describes embodiments of the present invention involved with performing test and/or measurement functions and/or controlling and/or modeling instrumentation or industrial automation hardware. However, it is noted that the present invention can be used for a plethora of applications and are not limited to instrumentation or industrial automation applications. In other words, the following description is exemplary only, and the present invention may be used in any of various types of systems.

FIG. 8A illustrates an exemplary instrumentation control system 100. In one embodiment, the present invention may be utilized in an instrumentation application implemented by the instrumentation control system 100. The system 100 includes a host computer 82 that comprises a CPU, a display screen, memory, and one or more input devices such as a mouse or keyboard as shown. The host computer 82 may connect to one or more instruments to analyze, measure, or control a unit under test (UUT) or process 150.

The host computer 82 may interface with motion control hardware 136 via an associated motion control interface card 138 or other motion control device. For example, the motion control hardware 136 may be involved in analyzing, measuring, or controlling the unit under test (UUT) or process 150. In one embodiment, the host computer 82 may execute one or more of the trajectory generation, interpolation, and/or control algorithms involved in the motion control. In another embodiment, the trajectory generation, interpolation, and control algorithms may be executed by the motion control interface card 138. For example, the motion control interface card 138 may include one or more processors or FPGAs, such as described above.

The GPIB instrument 112 may be coupled to the computer 82 via the GPIB interface card 122 provided by the computer 82. In a similar manner, the video device 132 may be coupled to the computer 82 via the image acquisition card 134. The data acquisition board 114 may be coupled to the computer 82, and may interface through signal conditioning circuitry 124 to the UUT. The signal conditioning circuitry 124 may comprise an SCXI (Signal Conditioning eXtensions for Instrumentation) chassis comprising one or more SCXI modules 126.

The GPIB card 122, the image acquisition card 134, the motion control interface card 138, and the DAQ card 114 are typically plugged in to an I/O slot in the computer 82, such as a PCI bus slot, a PC Card slot, or an ISA, EISA or MicroChannel bus slot provided by the computer 82. However, these cards 122, 134, 138 and 114 are shown external to computer 82 for illustrative purposes. These devices may also be connected to the computer 82 through a serial bus or through other means.

The VXI chassis or instrument 116 may be coupled to the computer 82 via a VXI bus, MXI bus, or other serial or parallel bus provided by the computer 82. The computer 82 may include VXI interface logic, such as a VXI, MXI or GPIB interface card (not shown), which interfaces to the VXI chassis 116. The PXI chassis or instrument may be coupled to the computer 82 through the computer's PCI bus.

A serial instrument (not shown) may also be coupled to the computer 82 through a serial port, such as an RS-232 port, USB (Universal Serial bus) or IEEE 1394 or 1394.2 bus, provided by the computer 82. In typical instrumentation control systems an instrument will not be present of each interface type, and in fact many systems may only have one or more instruments of a single interface type, such as only GPIB instruments.

The instruments may be coupled to a unit under test (UUT) or process 150, or may be coupled to receive field signals, typically generated by transducers. The system 100 may be used in a data acquisition and control application, in a test and measurement application, an image processing or machine vision application, a process control application, a man-machine interface application, a simulation application, a hardware-in-the-loop validation application, etc.

FIG. 8B illustrates an exemplary industrial automation system 160. In one embodiment, the present invention may be utilized in an automation application implemented by the industrial automation system 160. The industrial automation system 160 is similar to the instrumentation or test and measurement system 100 shown in FIG. 8A. Elements which are similar or identical to elements in FIG. 8A have the same reference numerals for convenience. The system 160 includes a host computer 82 that comprises a CPU, a display screen, memory, and one or more input devices such as a mouse or keyboard as shown. The host computer 82 may connect to one or more devices or instruments to interact with a process or device 150 to perform an automation function, such as MMI (Man Machine Interface), SCADA (Supervisory Control and Data Acquisition), portable or distributed data acquisition, process control, advanced analysis, or other control.

In particular, the host computer 82 may interface with motion control hardware 136 via an associated motion control interface card 138 or other motion control device. For example, the motion control hardware 136 may be involved in performing the automation function performed by the industrial automation system 160. In one embodiment, the host computer 82 may execute one or more of the trajectory generation, interpolation, and/or control algorithms involved in the motion control. In another embodiment, the trajectory generation, interpolation, and control algorithms may be executed by the motion control interface card 138. For example, the motion control interface card 138 may include one or more processors or FPGAs, such as described above.

The host computer 82 may also interface with devices such as a data acquisition board 114 and associated signal conditioning circuitry 124, a PXI instrument 118, a video device 132 and associated image acquisition card 134, a fieldbus device 170 and associated fieldbus interface card 172, a PLC (Programmable Logic Controller) 176, a serial instrument 182 and associated serial interface card 184, or a distributed data acquisition system, such as the Fieldpoint system available from National Instruments, among other types of devices.

The DAQ card 114, the PXI chassis 118, the video device 132, and the image acquisition card 134 may be connected to the computer 82 as described above. The serial instrument 182 may be coupled to the computer 82 through a serial interface card 184, or through a serial port, such as an RS-232 port, provided by the computer 82. The PLC 176 may couple to the computer 82 through a serial port, Ethernet port, or a proprietary interface. The fieldbus interface card 172 may be comprised in the computer 82 and may interface through a fieldbus network to one or more fieldbus devices. Each of the DAQ card 114, the serial card 184, the fieldbus card 172, the image acquisition card 134, and the motion control card 138 are typically plugged in to an I/O slot in the computer 82 as described above. However, these cards 114, 184, 172, 134, and 138 are shown external to computer 82 for illustrative purposes. In typical industrial automation systems a device will not be present of each interface type, and in fact many systems may only have one or more devices of a single interface type, such as only PLCs. The devices may be coupled to the device or process 150.

As used herein, the term "instrument" is intended to include any of the devices that are adapted to be connected to a computer system as shown in FIGS. 8A and 8B, traditional "stand-alone" instruments, as well as other types of measurement and control devices. The term "measurement function" may include any type of data acquisition, measurement or control function, such as that implemented by the instruments shown in FIGS. 8A and 8B. For example, the term "measurement function" includes acquisition and/or processing of an image.

In the embodiments of FIGS. 8A and 8B above, one or more of the various instruments may couple to the computer 82 over a network, such as the Internet, an Ethernet network, or other wired or wireless network connection.

It is noted that although FIGS. 8A and 8B illustrate the motion control interface card 138 coupled to the computer system 82, in other embodiments a motion control device may operate independently, e.g., as a standalone device. For example, the motion control device may include one or more processors or FPGAs which may be configured to execute program instructions to independently perform the motion control. As described below, in one embodiment, the computer system 82 may operate to configure the motion control device. In one embodiment, the computer system 82 may configure the motion control device but may not be involved in performing the actual motion control.

Figure 9:
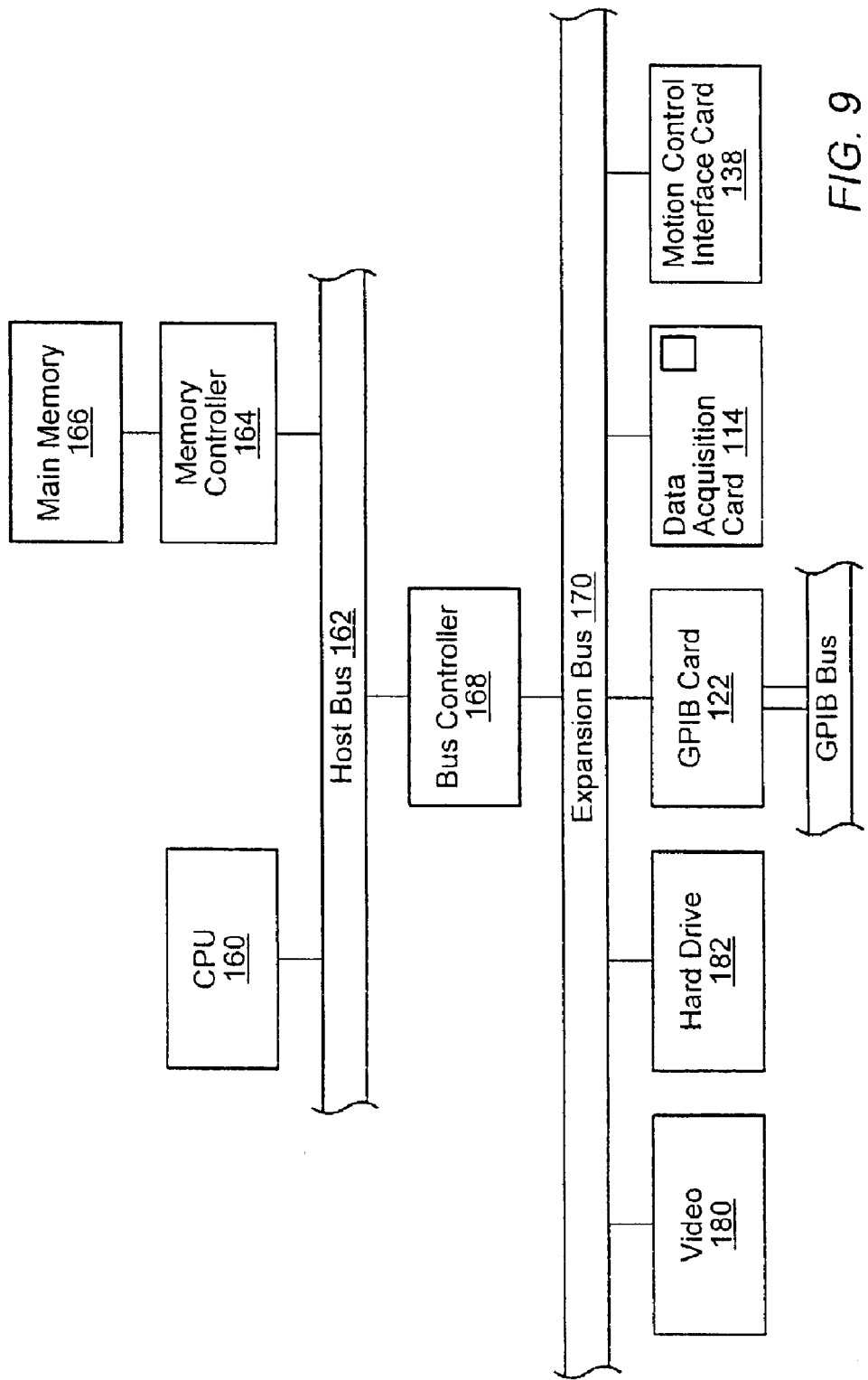
FIG. 9 is a block diagram representing one embodiment of the computer system illustrated in FIGS. 8A and 8B.

FIG. 9—Computer System Block Diagram

FIG. 9 is a block diagram representing one embodiment of the computer system 82 illustrated in FIGS. 8A and 8B. It is noted that any type of computer system configuration or architecture can be used as desired, and FIG. 9 illustrates a representative PC embodiment. It is also noted that the computer system may be a general purpose computer system, a computer implemented on a VXI card installed in a VXI chassis, a computer implemented on a PXI card installed in a PXI chassis, or other types of embodiments. Elements of a computer not necessary to understand the present description have been omitted for simplicity.

The computer may include at least one central processing unit or CPU 160 which is coupled to a processor or host bus 162. The CPU 160 may be any of various types, including an x86 processor, e.g., a Pentium class, a PowerPC processor, a CPU from the SPARC family of RISC processors, as well as others. Main memory 166 is coupled to the host bus 162 by means of memory controller 164.

In one embodiment, the main memory 166 may store software operable to configure a motion control device as described below. For example, the software may operate to create a hardware executable format and may configure the motion control device using the hardware executable format. In another embodiment the software may operate to configure the motion control device by storing a program or a portion of a program in a memory of the motion control device. In one embodiment, the main memory 166 may store one or more software programs on which the configuration of the motion control device is based. For example, a hardware executable format may be created based on the one or more software programs, or the one or more software programs may be stored in a memory of the motion control device. In one embodiment the motion control device may be configured to perform a sequence of motion control operations. In one embodiment the sequence of motion control operations may be created using a motion control prototyping environment application. In one embodiment, the motion control prototyping environment application may be stored in the main memory 166. The main memory 166 may also store operating system software, as well as other software for operation of the computer system.

The host bus 162 may be coupled to an expansion or input/output bus 170 by means of a bus controller 168 or bus bridge logic. The expansion bus 170 may be the PCI (Peripheral Component Interconnect) expansion bus, although other bus types can be used. The expansion bus 170 includes slots for various devices such as a motion control interface card 138, data acquisition board 114, and a GPIB interface card 122 which provides a GPIB bus interface to a GPIB instrument. The computer 82 further comprises a video display subsystem 180 and hard drive 182 coupled to the expansion bus 170.

In one embodiment the motion control interface card 138 may comprise a functional unit, such as a programmable hardware element (e.g., FPGA) and/or processor and memory. In other embodiments a motion control device may take on various other form factors and may be coupled to the computer 82 in any of various other ways or may operate independently from the computer 82. In one embodiment the computer 82 may also include a network interface for coupling to a network, wherein the motion control device including the functional unit may be coupled to the network. Thus the computer 82 may be used for configuring a functional unit in a motion control device over a network. In one embodiment, the network may be a wireless network.

Figure 10:
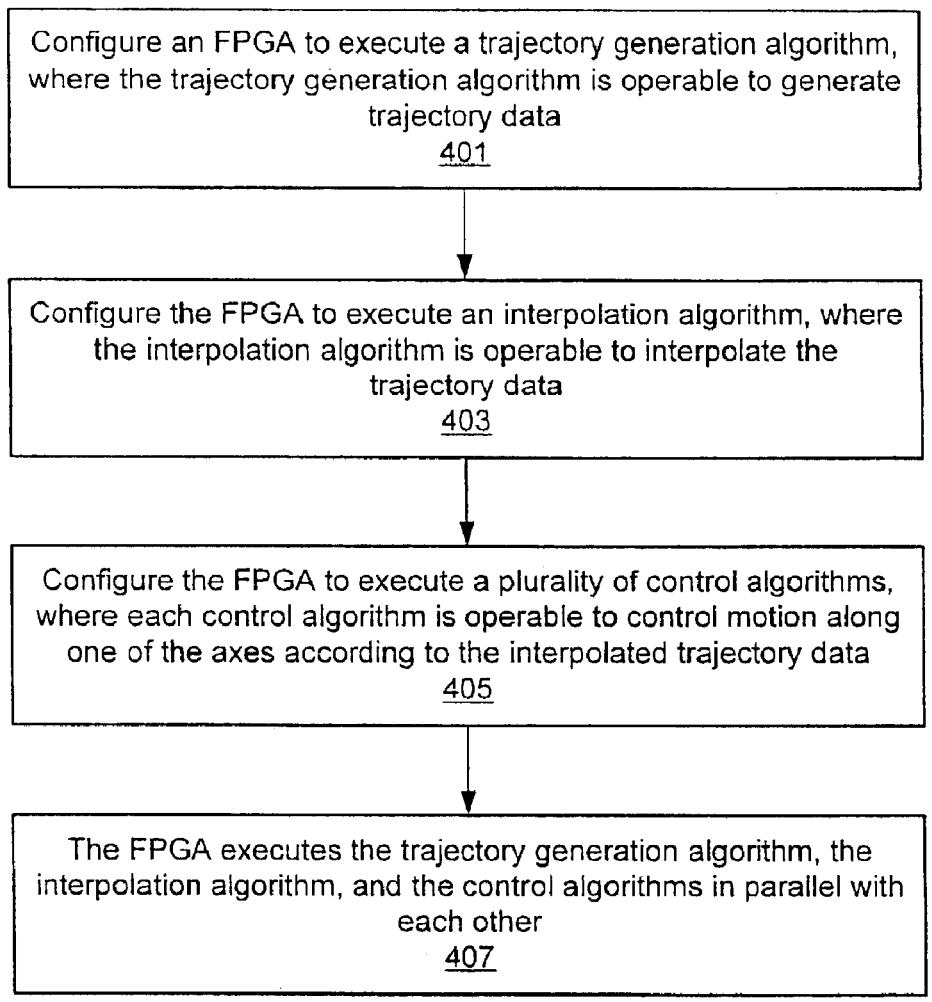
FIG. 10 is a flowchart diagram illustrating one embodiment of a method for configuring a motion control device to perform trajectory generation, interpolation, and control in parallel.

FIG. 10—Parallel Trajectory Generation, Interpolation, and Control

FIG. 10 is a flowchart diagram illustrating one embodiment of a method for configuring a motion control device to perform trajectory generation, interpolation, and control in parallel. In the embodiment shown in FIG. 10, the motion control device includes a Field Programmable Gate Array (FPGA), and configuring the motion control device comprises configuring the FPGA. It is noted that FIG. 10 illustrates a representative embodiment, and alternative embodiments are contemplated. Also, various elements may be combined, omitted, or performed in different orders.

In 401, the FPGA may be configured to execute a trajectory generation algorithm. The trajectory generation algorithm may be operable to generate trajectory data. Generating the trajectory data may include calculating points along a path of movement. The calculated points may then be used in controlling motion along the path, e.g., to perform a straight line move, arc move, contoured move, or other type of move. In one embodiment, the motion control device may be operable to perform a sequence of moves or motion control operations. Thus, the trajectory generation algorithm may be operable to generate trajectory data for each move in the sequence. In various embodiments, the trajectory generation algorithm may be performed in any of various ways. In one embodiment the trajectory generation algorithm may be implemented as a loop.

In 403, the FPGA may be configured to execute an interpolation algorithm. The interpolation algorithm may be operable to interpolate the trajectory data generated by the trajectory generation algorithm. For example, interpolating the trajectory data may comprise performing a spline algorithm or other algorithm that interpolates between points generated by the trajectory generation algorithm to maintain smooth motion. Thus, the interpolated trajectory data may be used in controlling the motion rather than the raw trajectory data. In another embodiment, it may not be necessary to interpolate the trajectory data. For example, the application may not require smooth motion, or the points generated by the trajectory generation algorithm may be spaced so as to cause sufficiently smooth motion. Also, in one embodiment the trajectory generation and interpolation may be combined in a single algorithm. In various embodiments, the interpolation algorithm may be performed in any of various ways. In one embodiment the interpolation algorithm may be implemented as a loop.

In 405, the FPGA may be configured to execute one or more control algorithms. The number of control algorithms may depend on the number of axes of motion for the particular application. Each control algorithm may be operable to control motion along one of the axes according to the interpolated trajectory data. For example, for motion in two dimensions, there may be two control algorithms. In various embodiments, the control algorithm(s) may be performed in any of various ways. In one embodiment each control algorithm may be implemented as a loop.

Configuring the FPGA to execute the trajectory generation algorithm, the interpolation algorithm, and the control algorithms as described above may include configuring the FPGA to execute the trajectory generation algorithm, the interpolation algorithm, and the control algorithms in parallel with each other. In 407, the FPGA may execute the trajectory generation algorithm, the interpolation algorithm, and the control algorithms in parallel with each other.

Performing trajectory generation, interpolation, and control in parallel may increase the efficiency of the motion control application. For example, in one embodiment the motion may be performed incrementally at fixed time-step intervals. For example, a timer may cause periodic timer interrupts at the fixed time-step intervals. At each timer interrupt, the control algorithms may execute to control motion along the axes. In one embodiment the execution of the trajectory generation and interpolation algorithms may be staggered with respect to the control algorithms, e.g., in a pipelining manner, so that the interpolated trajectory data needed by the control algorithms for the current motion increment is immediately available when each timer interrupt occurs. Thus, the speed at which the control algorithms can perform the motion for each increment may be dependent only on the operations performed by the control algorithms themselves, since the trajectory generation and interpolation do not have to be performed in serial with the control. As noted above, in a motion control application involving multiple axes, separate control algorithms may be responsible for controlling motion along each of the axes. Executing the control algorithms in parallel with each other may allow the movement along the different axes to be performed in parallel. This may also increase the efficiency of the motion control application.

Also, the FPGA may be well-suited for performing the calculations involved in the trajectory generation and interpolation, which may also increase the efficiency of the motion control application.

In various embodiments, the trajectory generation, interpolation, and control algorithms may be coordinated with each other in any of various ways. In one embodiment, the algorithms may share data through a shared memory. For example, the trajectory generation algorithm may operate to generate trajectory data and write the trajectory data to a first area of memory. The interpolation algorithm may read the trajectory data from the first area of memory, interpolate the trajectory data, and write the interpolated trajectory data to a second area of memory. The control algorithms may read the interpolated trajectory data from the second area of memory and use the data in controlling motion, as described above.

As noted above, in one embodiment, the trajectory generation algorithm, interpolation algorithm, and/or control algorithms may be implemented as loops. For example, each iteration of the trajectory generation loop may execute to generate trajectory data for a single increment of motion. Similarly, each iteration of the interpolation loop may execute to interpolate trajectory data for a single increment of motion, and each iteration of the control loop(s) may execute to cause a single increment of motion. In one embodiment a single trajectory generation loop may generate trajectory data for multiple axes of motion. For example, the trajectory generation for the multiple axes may be calculated together as part of a vector space. In another embodiment, trajectory data for each axis may be generated by a separate trajectory generation loop. Similarly, trajectory data for multiple axes may be interpolated by either a single interpolation loop or a plurality of interpolation loops. In an embodiment in which there are a plurality of trajectory generation loops or a plurality of interpolation loops, the plurality of loops may execute in parallel, similarly as described above.

In one embodiment, the trajectory generation, interpolation, and control loops may execute in parallel at different loop rates. For example, the trajectory generation loop may execute to generate trajectory data as fast as possible, storing the trajectory data generated by each iteration of the loop in a first area of memory. The interpolation loop may also execute as fast as possible, which may be at a faster or slower rate than the trajectory generation loop. If the interpolation loop is able to interpolate the trajectory data faster than the trajectory generation loop can generate the trajectory data, the interpolation loop may have to wait until data is written to the first area of memory. The control loop(s) may also execute as fast as possible. If the control loops are able to control the motion using the trajectory data faster then the trajectory data can be generated or interpolated, the control loops may have to wait until the interpolated trajectory data is written to the second area of memory.

In another embodiment, the loops may be locked together at a single loop rate. For example, each iteration of the various loops may execute in response to a timer interrupt generated by a single timer. The rate at which the timer interrupts are generated may depend on the maximum of $L_1$, $L_2$, and $L_3$ values, where $L_1$ represents the fastest possible loop rate for the trajectory generation loop, $L_2$ represents the fastest possible loop rate for the interpolation loop, and $L_3$ represents the fastest possible loop rate for the control loops. In other words, the rate at which the loops execute may be limited by trajectory generation, interpolation, or control, whichever is slowest. In a typical motion control application, trajectory generation is the limiting factor.

In some applications it may not be necessary to perform the trajectory generation algorithm in parallel with the interpolation and control algorithms. For example, if the desired trajectory of motion is known ahead of time, the trajectory data may be generated ahead of time and may be stored for later use by the interpolation algorithm (or the control algorithm). In a similar manner it may also be possible to interpolate the trajectory data ahead of time and store the interpolated trajectory data for later use by the control algorithm. For example, in one embodiment the only algorithms that are executed in real time may be a plurality of control algorithms which execute in parallel as described above.

Although the method is described above in terms of configuring an FPGA on the motion control device to execute the trajectory generation, interpolation, and control algorithms, various alternative embodiments are contemplated. For example, in another embodiment, the motion control device may include another type of functional unit instead of or in addition to an FPGA. For example, the motion control device may include another type of programmable or configurable device which may be configured to execute the trajectory generation, interpolation, and control algorithms in parallel.

Also, in one embodiment the trajectory generation, interpolation, and control algorithms may not all be executed by the same device. For example, the motion control device may include a plurality of FPGAs, where each FPGA executes one or more of the algorithms. In another embodiment, the motion control device may include a plurality of processors and one or more memories. Program instructions implementing the trajectory generation, interpolation, and control algorithms may be stored in the one or more memories such that the plurality of processors can execute the algorithms in parallel. In another embodiment, the motion control device may include one or more FPGAs as well as one or more processors and one or more memories. Thus, the algorithms may be executed in parallel by a combination of FPGAs and processors.

In other embodiments, one or more of the trajectory generation, interpolation, and control algorithms may not be executed on the motion control device, i.e., may not be executed by an FPGA or processor on the motion control device. For example, in one embodiment one or more of the algorithms may be executed by another computer system, such as the computer system 82 illustrated in FIGS. 8A and 8B. The computer system 82 and the motion control device may coordinate to execute the algorithms in parallel. In another embodiment, all of the trajectory generation, interpolation, and control algorithms may be executed in parallel on another computer system, such as the computer system 82. In this case, the motion control device may simply receive signals generated by the control algorithm(s) and may not perform any computation of its own.

Figure 11:
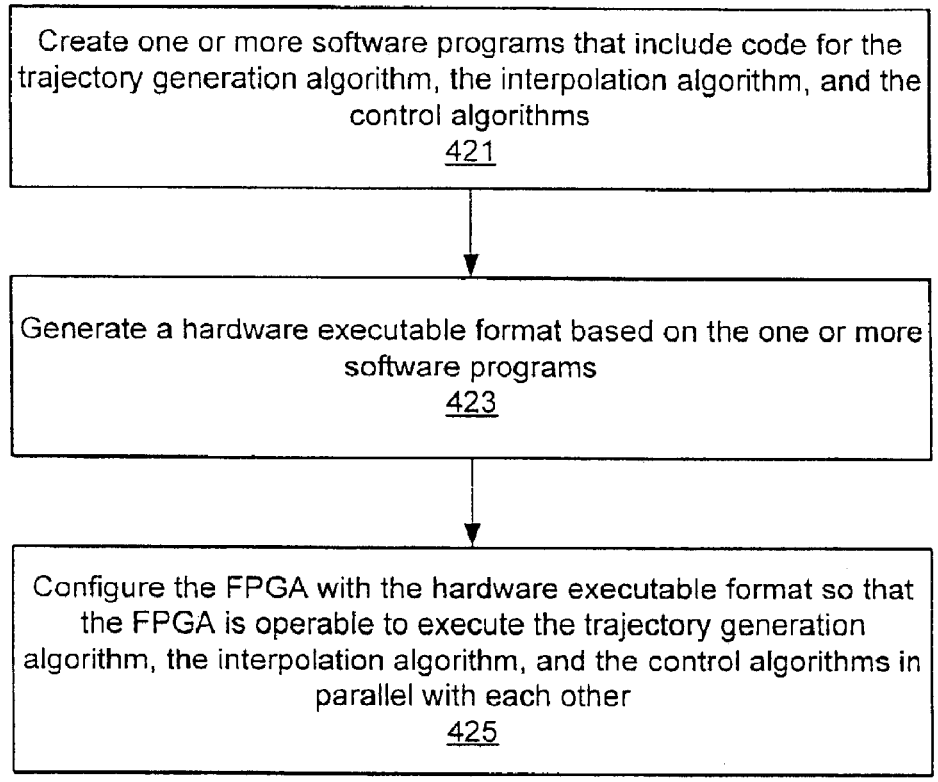
FIG. 11 is a flowchart diagram illustrating one embodiment of a method for configuring an FPGA of a motion control device.

FIG. 11—Configuring the FPGA

As described above, in one embodiment configuring a motion control device to execute a trajectory generation algorithm, interpolation algorithm, and one or more control algorithms in parallel comprises configuring an FPGA on the motion control device to execute these algorithms. In various embodiments, any of various techniques may be used to configure the FPGA. FIG. 11 is a flowchart diagram illustrating one embodiment of a method for configuring the FPGA. It is noted that FIG. 11 illustrates a representative embodiment, and alternative embodiments are contemplated. Also, various elements may be combined, omitted, or performed in different orders.

In 421, one or more software programs may be created. The one or more software programs may include code, e.g., source code, for the trajectory generation algorithm, the interpolation algorithm, and the control algorithms. In one embodiment, a separate software program may be created for each algorithm.

The code for each algorithm may specify operation or functionality of the respective algorithm. For example, where the trajectory generation algorithm is implemented as a loop, the program may include source code specifying the loop (e.g., a While loop, For loop, etc.) and specifying operations within the loop to calculate the trajectory data. In various embodiments, the one or more software programs may include software programs of any kind. In one embodiment, the one or more software programs may include one or more text-based programs, such as a C, C++, Java, Visual C++, Pascal, or Visual Basic program, or a program written in another text-based language. In another embodiment, the one or more software programs may include one or more graphical programs, e.g., one or more LabVIEW programs.

In 423, a hardware executable format may be generated based on the one or more software programs. In one embodiment, generating the hardware executable format may include generating a netlist. The netlist may include various hardware-specific description formats specifying information regarding the particular hardware elements required to implement a hardware design based on the one or more software programs and the relationship among those elements. In one embodiment, generating the hardware executable format may comprise generating an intermediate hardware description based on the one or more software programs, where the hardware description describes a hardware implementation of the software program(s). The hardware executable format may then be generated based on the hardware description. In another embodiment, 423 may comprise generating a plurality of hardware executable formats. For example, each hardware executable format may correspond to one of the trajectory generation, interpolation algorithm, or control algorithms.

In 425, the FPGA may be configured with the hardware executable format(s). For example, the motion control device or FPGA may be coupled to a computer system (such as the computer system 82), and the computer system may communicate with the FPGA to configure the FPGA with the hardware executable format(s). The FPGA may be configured with the hardware executable format(s) such that the FPGA is operable to execute the trajectory generation algorithm, the interpolation algorithm, and the control algorithms in parallel with each other, as described above.

In one embodiment, creating the software program(s) in 421 may comprise creating a software program for causing motion along a specific trajectory, where the trajectory is hardcoded into the software program. Thus, in one embodiment to change the motion performed by the motion control device, a new software program specifying a new trajectory may be created, and the FPGA may be re-configured using the new software program.

In another embodiment, the software program created in 421 may be operable to cause motion along any of various trajectories. For example, the software program may utilize information specifying a desired trajectory to generate appropriate trajectory data to cause motion along the desired trajectory. In other words, if the information is changed to specify a different trajectory, the software program may be operable to generate different trajectory data reflecting the different trajectory. Thus in one embodiment, an FPGA that is configured based on the software program may be operable to utilize information specifying the desired trajectory to generate appropriate trajectory data in a similar manner. For example, the information may be stored in the FPGA or in a memory of the motion control device. In this embodiment, the trajectory information stored in the FPGA or memory may be changed to change the motion performed by the motion control device, without having to re-configure the FPGA with a different software program.

As described above with reference to FIG. 10, in one embodiment it may be desirable to perform a sequence of motion control operations. The user may utilize a software application, also referred to as a prototyping environment, to design a motion control sequence. In one embodiment, the prototyping environment may be operable to automatically, i.e., programmatically, generate a software program which includes code specifying trajectory generation, interpolation, and control algorithms, where the algorithms are operable to perform the specific motion control sequence specified by the user. Thus, in one embodiment the FPGA may be configured based on a software program that is programmatically generated based on a specific motion control sequence, so that the FPGA is operable to perform the motion control sequence using the parallel techniques described above.

As described above, in other embodiments, the trajectory generation algorithm, interpolation algorithm, and/or control algorithm(s) may be executed by a device other than an FPGA, such as a plurality of processors. Thus, in other embodiments, configuring the motion control device may comprise configuring a device other than an FPGA. For example, where a plurality of processors are utilized, the configuration may comprise storing the programs created in 421 in a memory for parallel execution by the processors.

Figure 12:
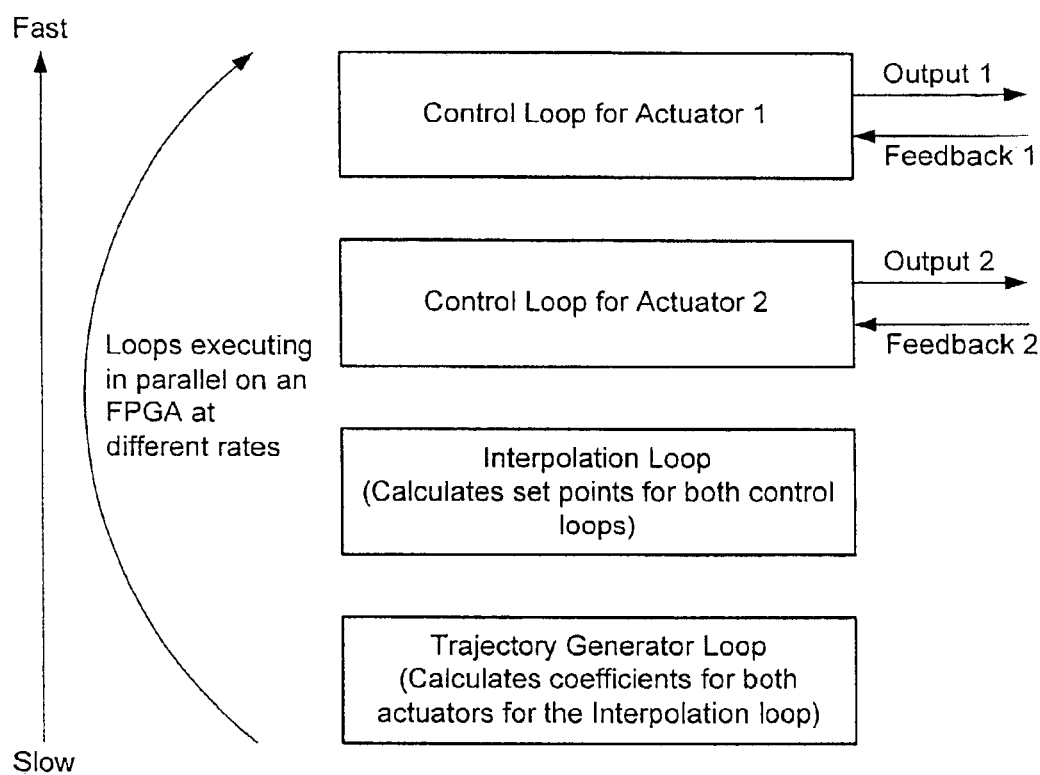
FIGS. 12 and 13 illustrate embodiments of a system in which a trajectory generation loop, interpolation loop, and a plurality of control loops execute in parallel with each other.
Figure 13:
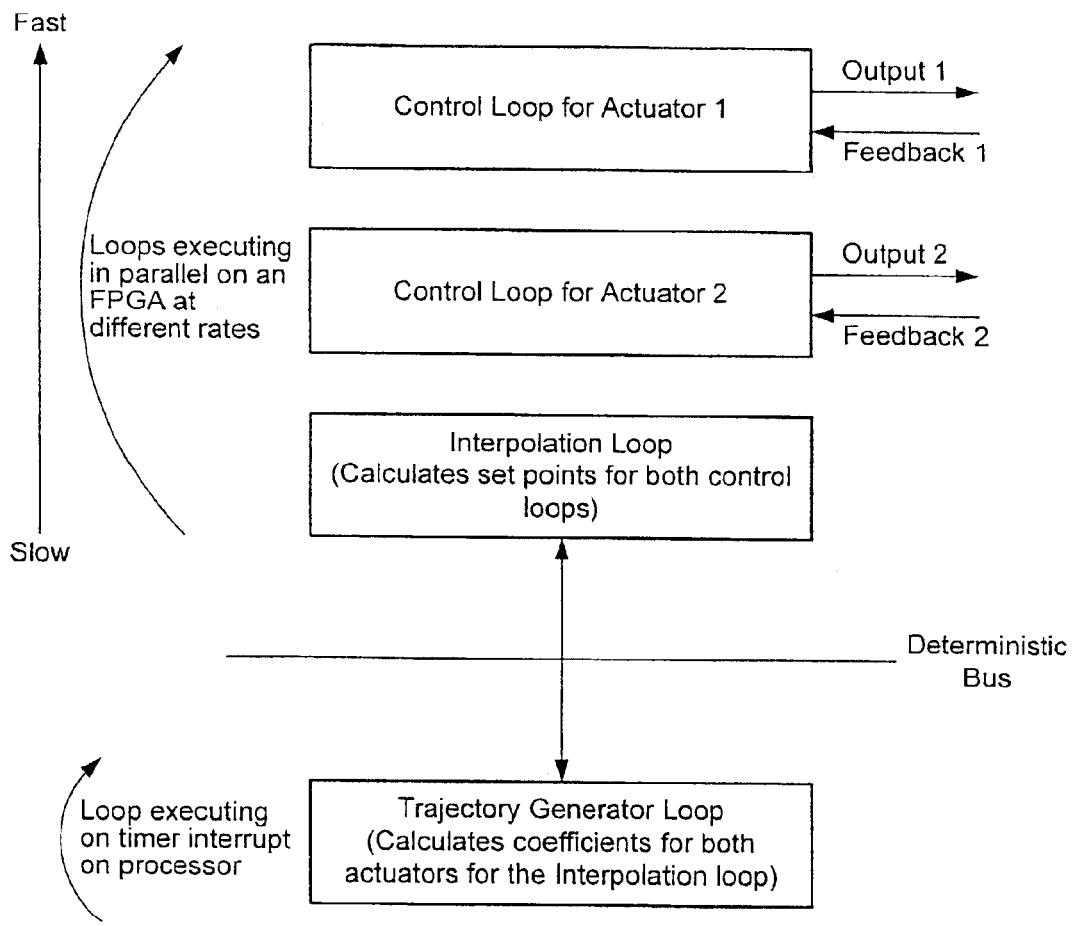

FIGS. 12–13: Exemplary Systems

FIG. 12 illustrates one embodiment of a system which executes a trajectory generation loop, interpolation loop, and a plurality of control loops in parallel with each other. As shown, the trajectory generation loop may be executed slower than the interpolation loop, which in turn may execute slower than the control loop. Trajectory generation for multiple actuators may be performed together, e.g., as part of a vector space. Thus, a single loop may perform trajectory generation for multiple actuators. As shown, control loops for each actuator may execute independently.

Each loop may write to local variables, which are read by the other loops. As one example of the loop rates involved, the trajectory generator may update the coefficients every millisecond, which are used by the interpolation loop to calculate a new set point for the control loop every 100 microseconds. The set points are used by the control loops, which may execute at 10 microseconds. It is noted that these loop rates are exemplary only. A state machine between the trajectory generator and interpolation loop may guarantee update of the coefficients periodically and without any race condition.

Motion along multiple axes may be performed by the independent control loops which execute in parallel with each other. The system of FIG. 12 may allow the control loops to execute fast without having any burden of calculating the trajectory or the interpolated points. The system may also reduce jitter associated with the control loop execution. The control loop may have a very deterministic calculation time, resulting in minimal to almost negligible jitter.

FIG. 13 illustrates an embodiment in which the trajectory generator loop is performed on a different hardware system than the interpolation and control loops. For example, the trajectory generation loop may be executed on a processor, while the interpolation and control loops execute on an FPGA. The hardware systems may communicate, e.g., through a deterministic communication bus or other transport system.

Figure 14:
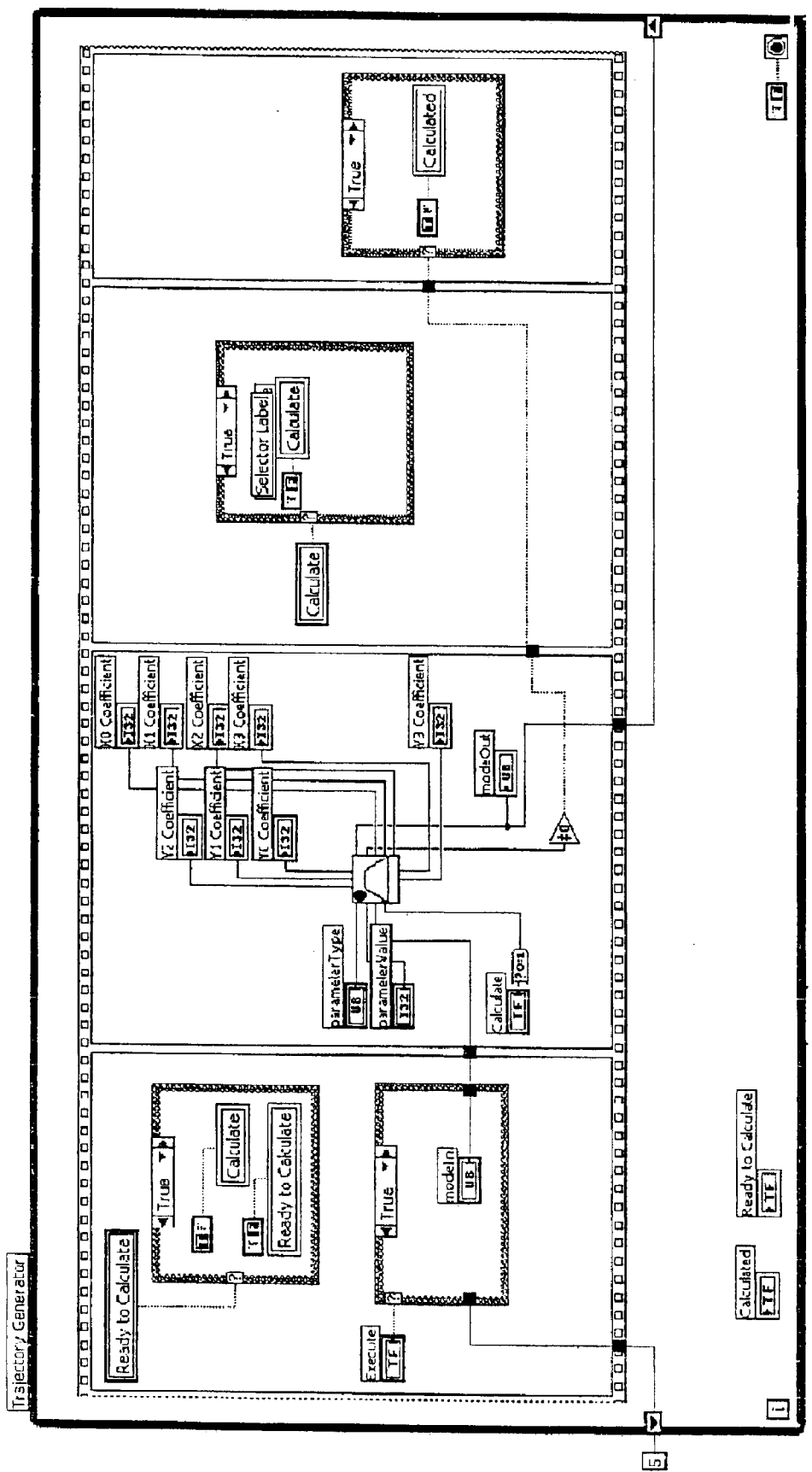
FIG. 14 illustrates an exemplary graphical program that implements an exemplary trajectory generation loop.
Figure 15:
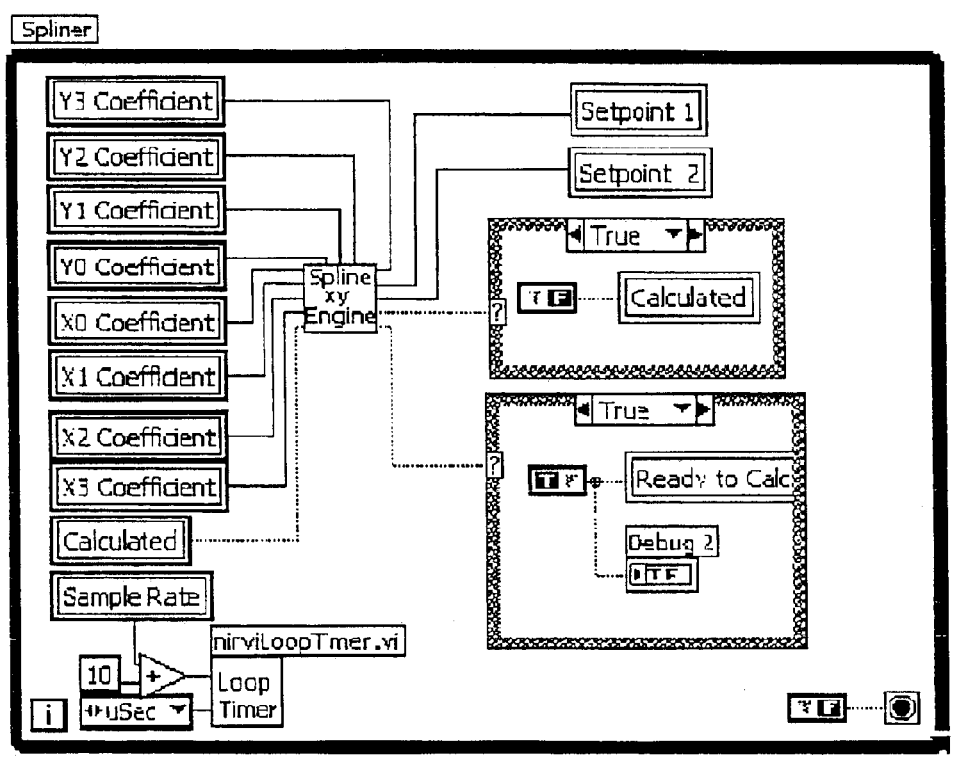
FIG. 15 illustrates an exemplary graphical program that implements an exemplary interpolation loop.
Figure 16:
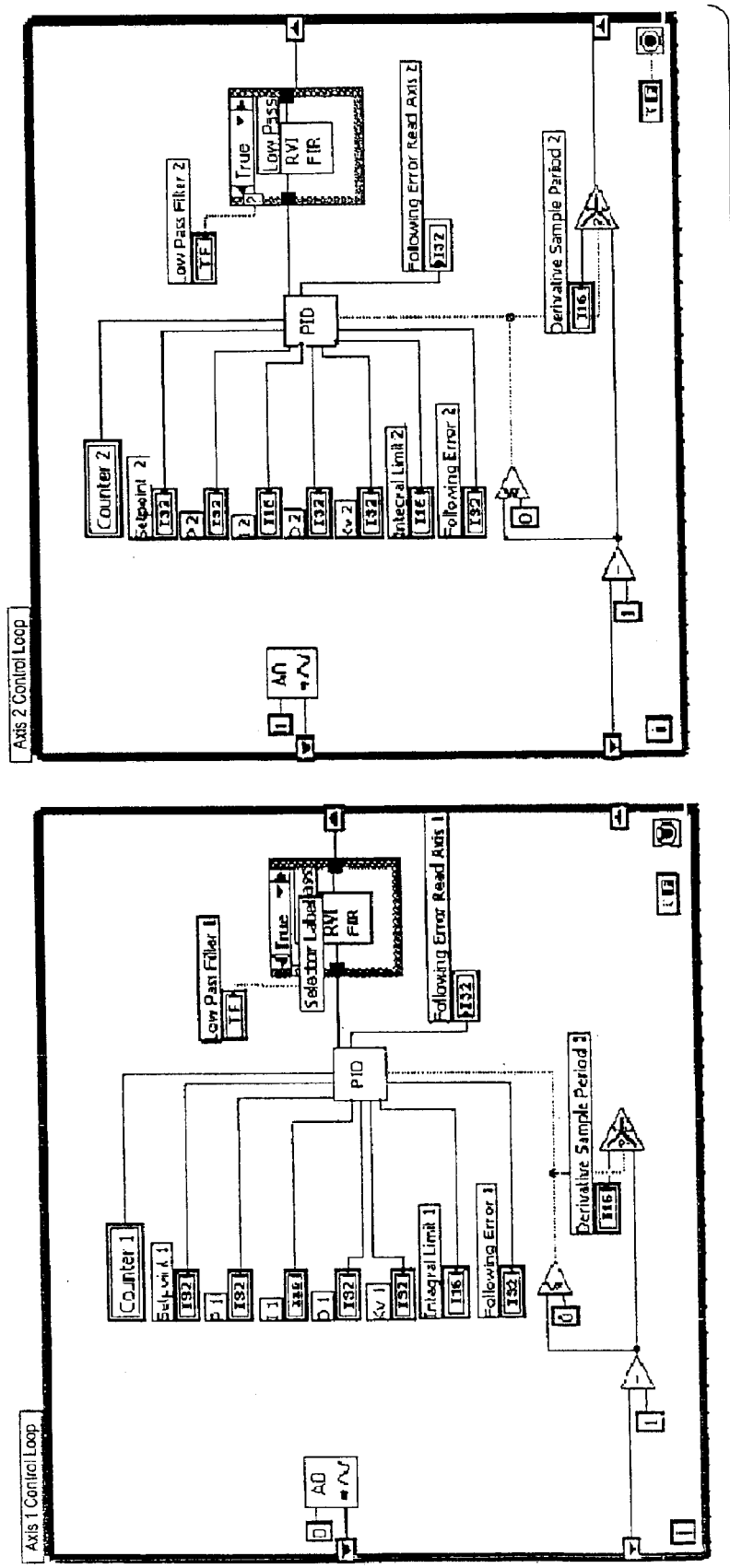
FIG. 16 illustrates an exemplary graphical program that implements two exemplary control loops.

FIGS. 14–16: Example Graphical Programs

As noted above, in one embodiment one or more graphical programs may be created in 421 of FIG. 11. FIGS. 14–16 illustrate exemplary graphical programs. FIG. 14 illustrates a block diagram of a graphical program which specifies an exemplary trajectory generation loop. FIG. 15 illustrates a block diagram of a graphical program which specifies an exemplary interpolation loop. FIG. 16 illustrates a block diagram of a graphical program which specifies two exemplary control loops, one for each of two axes of motion.

In the present application, the term "graphical program" or "block diagram" is intended to include a program comprising graphical code, e.g., two or more interconnected nodes or icons, wherein the interconnected nodes or icons may visually indicate the functionality of the program. The nodes may be connected in one or more of a data flow, control flow, and/or execution flow format. The nodes may also be connected in a "signal flow" format, which is a subset of data flow. Thus the terms "graphical program" or "block diagram" are each intended to include a program comprising a plurality of interconnected nodes or icons which visually indicate the functionality of the program.

Examples of graphical programming development environments that may be used to create and/or execute graphical programs include LabVIEW, DasyLab, and DiaDem from National Instruments, VEE from Agilent, WiT from Coreco, Vision Program Manager from PPT Vision, SoftWIRE from Measurement Computing, Simulink from the MathWorks, Sanscript from Northwoods Software, Khoros from Khoral Research, SnapMaster from HEM Data, VisSim from Visual Solutions, ObjectBench by SES (Scientific and Engineering Software), and VisiDAQ from Advantech, among others.

Although the embodiments above have been described in considerable detail, numerous variations and modifications will become apparent to those skilled in the art once the above disclosure is fully appreciated. It is intended that the following claims be interpreted to embrace all such variations and modifications.

I claim:

1. A method for controlling a motion control device, the method comprising:

executing a trajectory generation algorithm, wherein the trajectory generation algorithm is operable to generate trajectory data;

executing an interpolation algorithm, wherein the interpolation algorithm is operable to interpolate the trajectory data; and executing a control algorithm, wherein the control algorithm is operable to control the motion control device using the interpolated trajectory data;

wherein the trajectory generation algorithm, the interpolation algorithm, and the control algorithm execute in parallel with each other.

2. The method of claim 1, wherein said executing the trajectory generation algorithm comprises executing a first loop, wherein the first loop is operable to generate the trajectory data;

wherein said executing the interpolation algorithm comprises executing a second loop, wherein the second loop is operable to interpolate the trajectory data;

wherein said executing the control algorithm comprises executing a third loop, wherein the third loop is operable to control the motion control device using the interpolated trajectory data;

wherein the first loop, the second loop, and the third loop execute in parallel with each other.

3. The method of claim 1, wherein the trajectory generation algorithm, the interpolation algorithm, and the control algorithm are executed by an FPGA;

wherein the FPGA executes the trajectory generation algorithm, the interpolation algorithm, and the control algorithm in parallel with each other.

4. The method of claim 3, wherein the FPGA is a component of the motion control device.

5. The method of claim 3, further comprising:

configuring the FPGA to execute the trajectory generation algorithm, the interpolation algorithm, and the control algorithm.

6. The method of claim 5, wherein said configuring the FPGA to execute the trajectory generation algorithm, the interpolation algorithm, and the control algorithm comprises configuring the FPGA with a hardware executable format, wherein the hardware executable format specifies operation of the trajectory generation algorithm, the interpolation algorithm, and the control algorithm.

7. The method of claim 6, further comprising:

programmatically creating the hardware executable format based on one or more programs, wherein the one or more programs include program code for the trajectory generation algorithm, the interpolation algorithm, and the control algorithm.

8. The method of claim 1, wherein said executing the trajectory generation algorithm, the interpolation algorithm, and the control algorithm causes the motion control device to perform a sequence of motion control operations.

9. The method of claim 8,
wherein said motion control device performing the sequence of motion control operations comprises the motion control device controlling a motor to perform the sequence of motion control operations.

10. The method of claim 8, further comprising:
receiving information specifying the sequence of motion control operations.

11. The method of claim 10,
wherein said receiving information specifying the sequence of motion control operations comprises receiving user input specifying the sequence of motion control operations.

12. The method of claim 1, further comprising:
programmatically generating one or more software programs that implement a sequence of motion control operations;
wherein said programmatically generating the one or more software programs comprises programmatically including code in the one or more software programs to specify the trajectory generation algorithm, the interpolation algorithm, and the control algorithm.

13. The method of claim 12, further comprising:
configuring an FPGA based on the one or more software programs;
wherein the trajectory generation algorithm, the interpolation algorithm, and the control algorithm are executed by the configured FPGA.

14. The method of claim 13,
wherein said configuring the FPGA based on the one or more software programs comprises:
generating a hardware executable format based on the one or more software programs; and
configuring the FPGA with the hardware executable format.

15. The method of claim 12,
wherein said programmatically generating the one or more software programs comprises programmatically generating one or more graphical programs;
wherein each graphical program includes a plurality of interconnected nodes that visually indicate functionality of one or more of the trajectory generation algorithm, the interpolation algorithm, and the control algorithm.

16. The method of claim 1,
wherein the trajectory generation algorithm, the interpolation algorithm, and the control algorithm are executed by a single device.

17. The method of claim 14,
wherein the trajectory generation algorithm, the interpolation algorithm, and the control algorithm are executed by a single processor.

18. The method of claim 1,
wherein the trajectory generation algorithm, the interpolation algorithm, and the control algorithm are executed by multiple devices.

19. The method of claim 18,
wherein the trajectory generation algorithm, the interpolation algorithm, and the control algorithm are executed by multiple processors.

20. The method of claim 18,
wherein the trajectory generation algorithm, the interpolation algorithm, and the control algorithm are executed by multiple FPGAs.

21. The method of claim 18,
wherein the trajectory generation algorithm, the interpolation algorithm, and the control algorithm are executed by at least one processor and at least one FPGA.

22. The method of claim 18,
wherein each of the trajectory generation algorithm, the interpolation algorithm, and the control algorithm is executed by a different device.

23. The method of claim 18,
wherein two of the trajectory generation algorithm, the interpolation algorithm, and the control algorithm are executed by a single device;
wherein the other algorithm is executed by a different device.

24. A method for controlling a motion control device, the method comprising:
executing a first loop, wherein the first loop is operable to generate trajectory data;
executing a second loop, wherein the second loop is operable to interpolate the trajectory data; and
executing a third loop, wherein the third loop is operable to control the motion control device using the interpolated trajectory data;
wherein the first loop, the second loop, and the third loop execute in parallel with each other.

25. The method of claim 24,
wherein the first loop, the second loop, and the third loop are executed by an FPGA;
wherein the FPGA executes the first loop, the second loop, and the third loop in parallel with each other.

26. The method of claim 25,
wherein the FPGA is a component of the motion control device.

27. The method of claim 25, further comprising:
configuring the FPGA to execute the first loop, the second loop, and the third loop.

28. The method of claim 27,
wherein said configuring the FPGA to execute the first loop, the second loop, and the third loop comprises configuring the FPGA with a hardware executable format, wherein the hardware executable format specifies operation of the first loop, the second loop, and the third loop.

29. A method for controlling a motion control device, the method comprising:
executing a first loop on an FPGA, wherein the first loop is operable to generate trajectory data;
executing a second loop on the FPGA, wherein the second loop is operable to interpolate the trajectory data; and
executing a third loop on the FPGA, wherein the third loop is operable to control the motion control device using the interpolated trajectory data;
wherein the first loop, the second loop, and the third loop execute in parallel on the FPGA.

30. A method for configuring a motion control device, the method comprising:
configuring the motion control device to execute a trajectory generation algorithm, wherein the trajectory generation algorithm is operable to generate trajectory data;
configuring the motion control device to execute an interpolation algorithm, wherein the interpolation algorithm is operable to interpolate the trajectory data; and
configuring the motion control device to execute a control algorithm, wherein the control algorithm is operable to control the motion control device using the interpolated trajectory data;

wherein said configuring the motion control to execute the trajectory generation algorithm, the interpolation algorithm, and the control algorithm comprises configuring the motion control to execute the trajectory generation algorithm, the interpolation algorithm, and the control algorithm in parallel with each other.

31. The method of claim 30, wherein the motion control device includes an FPGA;

wherein said configuring the motion control device to execute the trajectory generation algorithm comprises configuring the FPGA to execute the trajectory generation algorithm;

wherein said configuring the motion control device to execute the interpolation algorithm comprises configuring the FPGA to execute the interpolation algorithm;

wherein said configuring the motion control device to execute the control algorithm comprises configuring the FPGA to execute the control algorithm;

wherein the FPGA is operable to execute the trajectory generation algorithm, the interpolation algorithm, and the control algorithm in parallel with each other.

32. A method for generating trajectory data for a motion control application, the method comprising:

creating a software program which specifies program instructions for generating the trajectory data;

converting the software program to a hardware executable format;

configuring an FPGA with the hardware executable format, wherein said configuring the FPGA with the hardware executable format comprises configuring the FPGA to generate the trajectory data; and executing the FPGA, wherein the FPGA executes to generate the trajectory data.

33. A method for interpolating trajectory data for a motion control application, the method comprising:

creating a software program which specifies program instructions for interpolating the trajectory data;

converting the software program to a hardware executable format;

configuring an FPGA with the hardware executable format, wherein said configuring the FPGA with the hardware executable format comprises configuring the FPGA to interpolate the trajectory data; and executing the FPGA, wherein the FPGA executes to interpolate the trajectory data.

34. A motion control device comprising:

an FPGA; and one or more control outputs;

wherein the FPGA is configured to execute:

a trajectory generation algorithm, wherein the trajectory generation algorithm is operable to generate trajectory data;

an interpolation algorithm, wherein the interpolation algorithm is operable to interpolate the trajectory data; and a control algorithm, wherein the control algorithm is operable to send signals to a motor via the one or more control outputs to control the motor;

wherein the FPGA executes the trajectory generation algorithm, the interpolation algorithm, and the control algorithm in parallel with each other.

35. A method for controlling motion along multiple axes, the method comprising:

generating trajectory data, wherein the trajectory data specifies a trajectory along each of the axes; and executing a plurality of control loops in parallel with each other, wherein each control loop executes to control motion along one of the axes according to the trajectory data.

36. The method of claim 35, wherein said executing the plurality of control loops in parallel with each other comprises executing the plurality of control loops in parallel on a single device.

37. The method of claim 36, wherein said executing the plurality of control loops in parallel on the single device comprises executing the plurality of control loops in parallel on an FPGA.

38. The method of claim 35, wherein said executing the plurality of control loops in parallel with each other comprises executing the plurality of control loops in parallel on separate devices.

39. The method of claim 35, wherein said generating the trajectory data comprises executing a loop to generate the trajectory data.

40. The method of claim 35, wherein said generating the trajectory data comprises executing a plurality of trajectory generation loops to generate the trajectory data;

wherein each trajectory generation loop generates trajectory data for one of the axes.

41. The method of claim 35, further comprising:

interpolating the trajectory data, wherein said interpolating the trajectory data comprises interpolating trajectory data for each of the axes;

wherein each control loop executes to control motion along one of the axes according to the interpolated trajectory data.

42. The method of claim 41, wherein said interpolating the trajectory data comprises executing a loop to generate the trajectory data.

43. The method of claim 42, wherein said interpolating the trajectory data comprises executing a plurality of interpolation loops to interpolate the trajectory data;

wherein each interpolation loop interpolates trajectory data for one of the axes.

44. A method for configuring a motion control device to control motion along multiple axes, the method comprising:

configuring the motion control device to execute a trajectory generation algorithm, wherein the trajectory generation algorithm is operable to generate trajectory data, wherein the trajectory data specifies a trajectory along each of the axes; and configuring the motion control device to execute a plurality of control loops, wherein each control loop executes to control motion along one of the axes according to the trajectory data;

wherein said configuring the motion control device to execute the plurality of control loops comprises configuring the motion control device to execute the plurality of control loops in parallel with each other.

45. The method of claim 44, wherein the motion control device includes an FPGA;

wherein said configuring the motion control device to execute the trajectory generation algorithm comprises configuring the FPGA to execute the trajectory generation algorithm;

wherein said configuring the motion control device to execute the plurality of control loops comprises configuring the FPGA to execute the plurality of control loops;

wherein the FPGA is operable to execute the plurality of control loops in parallel with each other.

* * * * *

UNITED STATES PATENT AND TRADEMARK OFFICE
CERTIFICATE OF CORRECTION

PATENT NO. : 6,865,441 B2
DATED : March 8, 2005
INVENTOR(S) : Chandhoke

It is certified that error appears in the above-identified patent and that said Letters Patent is hereby corrected as shown below:

Title page,
Item [74], *Attorney, Agent, or Firm*, please delete "Meyerstons" and substitute
-- Meyertons --.

Signed and Sealed this

Fourteenth Day of June, 2005

JON W. DUDAS
*Director of the United States Patent and Trademark Office*